United States Patent
Yankowski

[11] Patent Number: 6,147,940
[45] Date of Patent: *Nov. 14, 2000

[54] COMPACT DISC CHANGER UTILIZING DISC DATABASE

[75] Inventor: Carl J. Yankowski, Dover, Mass.

[73] Assignees: Sony Corporation, Tokyo, Japan; Sony Electronics Inc., Park Ridge, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/967,759

[22] Filed: Nov. 10, 1997

Related U.S. Application Data

[62] Division of application No. 08/507,544, Jul. 26, 1995, Pat. No. 5,751,672.

[51] Int. Cl.[7] .................................................. G11B 17/22
[52] U.S. Cl. ............................ 369/30; 369/34; 369/48
[58] Field of Search .................................. 369/30, 48, 34, 369/32, 49, 50, 59, 36, 38, 47, 58, 54; 360/19.1, 33.1; 358/341

[56] References Cited

U.S. PATENT DOCUMENTS

| | | | |
|---|---|---|---|
| 4,358,780 | 11/1982 | Sato | 346/135.1 |
| 4,397,011 | 8/1983 | Ogawa | 369/50 |
| 4,491,882 | 1/1985 | Fujiie | 360/53 |
| 4,587,643 | 5/1986 | Monen et al. | 369/32 |
| 4,701,900 | 10/1987 | Hasegawa et al. | 369/36 |
| 4,870,613 | 9/1989 | Clinkenbeard et al. | 369/30 X |
| 4,893,193 | 1/1990 | Nakamura et al. | 358/341 |
| 4,893,199 | 1/1990 | Okada | 360/48 |
| 5,148,418 | 9/1992 | Tsurushima | 369/32 |
| 5,243,588 | 9/1993 | Maeda et al. | 369/54 |
| 5,244,705 | 9/1993 | Tsurushima et al. | 428/64 |

(List continued on next page.)

FOREIGN PATENT DOCUMENTS

| | | |
|---|---|---|
| 0460869A2 | 12/1991 | European Pat. Off. . |
| 0580361A2 | 1/1994 | European Pat. Off. . |
| 0680040A2 | 11/1995 | European Pat. Off. . |
| 3-76082 | 2/1991 | Japan . |
| 7-1625 | 11/1995 | Japan . |
| H8-138357 | 5/1996 | Japan . |
| WO91/20082 | 12/1991 | WIPO . |

OTHER PUBLICATIONS

The Song Servant Advertisement, undated.
Denon DN–1400F 200 CD Changer Specification Sheet, undated.
CDP–CX153 100–Disc Changer, Features/Specifications, 1995 Sony Electronics Inc., 1 Sony Drive, Park Ridge, NJ 07656 (Feb. 1995).
Microsoft Windows Sound System, Version 2.0, Software User's Guide, Microsoft Corp. 1993, Dragon Systems, Inc., Newton, MA, USA, Doc. No. HA53828–0993.
Compact Disc Player, Operating Instructions, CDP–CX100/CDP–CX100S, 1993 Sony Corporation, Tokyo, Japan.
Compact Disc Technology, H. Nakajima/H. Ogawa, 1992, Pub. by Ohmsha, Ltd. 3–1 Kanda Nishiki–cho, Chiyoda–ku, Tokyo 101, Japan, Chap.5, pp. 85–124, ISBN 4–274–03347–3.

*Primary Examiner*—Ali Neyzari
*Attorney, Agent, or Firm*—Christopher M. Tobin

[57] ABSTRACT

A method and apparatus for updating a memory in a Compact Disc changer. Information identifying discs stored in a CD changer is stored in a memory. The memory is updated when a CD is loaded which does not have identifying features which are recognized by the CD changer. Updating is carried out via a modem connection to a remote database. The database can be stored locally in a local database residing in a personal computer where the database can be queried to locate desired tracks and can be used to facilitate control of the compact disc changer by providing a simplified interface for building a play list and the like.

6 Claims, 8 Drawing Sheets

U.S. PATENT DOCUMENTS

| | | | |
|---|---|---|---|
| 5,260,922 | 11/1993 | Chigasaki | 369/36 |
| 5,335,218 | 8/1994 | Osada | 369/178 |
| 5,341,350 | 8/1994 | Frank et al. | 369/30 |
| 5,446,714 | 8/1995 | Yoshio et al. | 369/48 |
| 5,475,835 | 12/1995 | Hickey | 395/600 |
| 5,559,764 | 9/1996 | Chen et al. | 369/30 |
| 5,615,345 | 3/1997 | Wanger | 369/30 X |
| 5,642,337 | 6/1997 | Oskay et al. | 369/30 |
| 5,691,964 | 11/1997 | Niederlein et al. | 369/30 |
| 5,740,134 | 4/1998 | Peterson | 369/30 |
| 5,751,672 | 5/1998 | Yankowski | 369/30 |

| MOVEMENT NO. | POINT | MOVEMENT ELAPSED TIME | | | | ABSOLUTE TIME FOR POINT CONTENT | | |
|---|---|---|---|---|---|---|---|---|
| | | MIN. | SEC. | FRAME | 0 | P MIN. | P SEC. | P FRAME |

COMPACT DISC CHANGER UTILIZING DISC DATABASE

This application is a division of application Ser. No. 08/507,544 filed Jul. 26, 1995, now U.S. Pat. No. 5,751,672 which is hereby incorporated by reference.

BACKGROUND

1. Field of the Invention

This invention relates generally to the field of audio and audio/video equipment including compact disc (CD) players. More particularly, this invention relates to a CD changer which can access a database which is user searchable and updated upon recognition of an unknown CD. This invention is particularly useful for multiple CD changers which serve to store substantial numbers of compact discs. In addition, this invention provides a mechanism for computer control of the operation of the CD changer.

2. Background of the Invention

Several large capacity compact disc players are currently available commercially. For example, Sony Corporation, Tokyo Japan produces several such players such as the model CDP-CX100 and the CDP-CX153, available through Sony Electronics Inc., 1 Sony Drive, Park Ridge, N.J. 07676. Each of these players includes an internal rotary table with 100 slots which can store up to 100 compact discs. Players with even higher storage capacity will no doubt appear in the future. Compact disc players of this nature are commonly used to not only play compact discs, but also as a convenient mechanism for storing such discs in a very neat and compact arrangement.

In earlier compact disc players which only hold one or a few discs, the compact discs are commonly stored in their protective jewel case. Such jewel cases generally include an insert provides a written directory for each disc which generally lists in order the selections available on the disc and often includes play times and other information regarding each selection (e.g. artist, title, author, etc.). Such information facilitates the listener's selection of the desired track or disc.

Unfortunately, this information may not be as readily available to the user of a CD player which is used as a storage device such as the above-mentioned high capacity CD players. Since users commonly use such players to store the compact discs, they also frequently store the jewel case and related informational inserts in a less convenient location. Moreover, the user must know not only the disc which he desires to play, but the location of the disc in the rotary table and perhaps a track number in order to readily access a particular chosen selection. In addition, it is difficult for the user to have a clear overview of the musical selections available and to control the play of such selections.

This problem has been partially addressed in the above Sony disc players by providing the user with the ability to program the disc player to store identifying information for each disc in the player's memory and to categorize discs into a number of groups of the user's selection (e.g. jazz, classical, Rock, etc.). These multiple CD changers utilize a portion of the table of contents (TOC) data for uniquely identifying each compact disc stored therein. In particular, the total music play time and the number of movements (typically songs) as indicated in the TOC is used in some changers to uniquely identify the discs. Compact disc changers also include a feature known as "Custom File" which is described in Japanese patent application publication number 03-76082 which is incorporated herein by reference. While this technique is helpful in locating a desired selection, the user still has only limited access to the available information relating to the disc. For example, there is no information available on the specified tracks on the disc, artist, etc. unless this information is used to identify the entire disc. Moreover, all such information must currently be entered by the user using a remote control or jog dial to cycle through available characters. The process of entering such data is somewhat inconvenient (especially for large numbers of discs) and thus often omitted by the user. Furthermore, the user of such players are currently restricted to controlling the discs using stored parameters (e.g. level and sound field selections) on a disc by disc basis without regard for the content of individual tracks on the disc.

While variations of compact disc format might permit various information about the disc to be included on the disc itself in machine readable form, there exists a large body of work which has no such identification information. Thus, there is a need to provide the user with access to an equivalent body of information to use, particularly in connection with high capacity multiple disc players.

The present invention addresses these problems by providing a database of the information for access by the user to provide searchable access to the information which and the ability to download such information. This minimizes and in most cases eliminates the need for data input by the user.

SUMMARY OF THE INVENTION

It is an object of the present invention to provide a compact disc player with access to an external database which permits easy selection of discs stored in a multiple disc player.

It is a feature that the present invention provides the ability to search a database for desired music selections with minimal or no user entry of the database data.

It is a further feature that the present invention identifies a CD by the table of contents area of the disc (or other unique identifying information) which is used as a "fingerprint" for the disc.

It is a further feature that certain embodiments of the present invention can facilitate control over playback parameters of a compact disc on a track-by-track basis.

It is an advantage that the present invention can provide a large body of searchable information for the user to access without entry of the data.

It is a further advantage of the present invention that compact discs or other storage media can be easily stored within a multiple disc player while producing an enhanced ability to locate a music selection of choice.

It is another advantage of embodiments of the present invention to provide for user control of the play selections of the CD player via the computer's user interface.

Broadly speaking, the present invention provides a modem link to a remote database which a user can utilize in order to provide information updates to a memory forming a part of a CD player. The system uses a "fingerprint" of a CD in order to search the remote database for information such as title, track names, artist, etc. Once the CD is identified, the information associated with the CD can be loaded into a local database so that the user can search for desired music, artists, etc. In addition, the information is loaded into the memory of a CD player so that discs stored in the CD player can be readily identified. This is especially useful for large capacity multiple CD players which are also used to store CDs. The user can further use the computer as a simplified control interface to search for selections, build play lists as well as enhance control of the playback operation.

The present invention contemplates many alternatives and variations. For example, in one aspect of the present invention, a system for playback of music compact discs includes a disc changer for receiving a compact disc and reading data from the disc to convert to signals representing music. An identifying portion of the disc is read in order to uniquely identify the disc. The identifying portion of the disc with a memory to determine if data relating to the compact disc is stored in the memory. A modem is provided along with a searching mechanism for accessing a remote database via the modem, wherein in the event the comparison does not detect the identifying information in the memory, the remote database is accessed via the modem to locate identifying information relating to the disc, the disc being identified in the database by the identifying portion. The information is then downloaded from the remote database to the memory.

In another aspect of the invention, a system for playback of music compact discs includes a disc changer for receiving a compact disc and reading data from the disc to convert to signals representing music. A portion of the changer reads an identifying portion of the disc which can be used to uniquely identify the disc. The identifying portion of the disc is compared with the memory to determine if data relating to the compact disc is stored in the memory. A first searching mechanism is provided for accessing a local database, wherein in the event the comparison does not detect the identifying portion in the memory, the first searching mechanism accesses the local database to locate the identifying portion relating to the disc, the disc being identified in the local database by the identifying portion. A second searching mechanism is provided for accessing a remote database via a modem, wherein in the event the comparison does not detect the identifying information in the memory and the first searching mechanism does not locate the identifying portion in the local database, the second searching mechanism accesses the remote database via the modem to locate identifying information relating to the disc, the disc being identified in the database by the identifying portion. The information is downloaded from either of the local database or the remote database to the memory.

In another aspect of the invention, a multiple disc compact disc player includes a multiple disc CD changer mechanism for playing and storing a plurality of compact discs. A memory stores information associated with the plurality of compact discs. A controller controls operations of the multiple disc compact disc player. A modem is coupled to the controller for accessing a remote database via a telephone line connection. The controller includes capability for issuing a first query to the memory to determine if the memory includes information associated with a selected disc in the CD changer mechanism, and for issuing a second query to a remote database via the modem in order to find information associated with the selected, if the first query fails to locate a information in the memory associated with the selected compact disc.

In another aspect of the invention, a system for playback of recorded media includes a media changer for receiving a recorded medium and reading data from the medium. An identifying portion of the medium is read and used to uniquely identify the medium. The identifying portion of the medium is compared with with a memory to determine if data relating to the medium is stored in the memory. A remote database is accessed and searched via a modem, wherein in the event the comparison does not detect the identifying information in the memory, the remote database is searched via the modem to locate identifying information relating to the medium, the medium being identified in the database by the identifying portion. The information relating to the medium is downloaded from the remote database to the memory.

A method of updating a memory in an audio compact disc changer according to an aspect of the invention includes the steps of: reading an identifying portion of a compact disc which uniquely identifies the compact disc; comparing the identifying portion with identifying portions stored in a memory; querying a database residing outside the compact disc changer for the identifying portion of the disc if the identifying portion is not found in the memory; and downloading data from the database to the memory corresponding to the identifying portion.

A method of updating a memory in recorded media player, according to an aspect of the invetion includes the steps of: reading an identifying portion of a recorded medium which uniquely identifies the medium; comparing the identifying portion with identifying portions stored in a memory; querying a database residing outside the recorded media player for the identifying portion of the medium if the identifying portion is not found in the memory; and downloading data from the database to the memory corresponding to the identifying portion.

The present invetion further contemplates a method for controlling the operation of a compact disc player, which in one aspect includes the steps of: storing data relating to a compact disc in a database, the database including information relating to each track of the compact disc; storing a playback attribute in the database on a track-by-track basis; and instructing the compact disc changer to play a selected track using the playback attribute.

Furthermore, the present invention contemplates a method of building a play list for a multiple disc compact disc changer, which in one embodiment includes the steps of: in a computer, storing information in a database about a plurality of compact discs residing in the multiple disc compact disc changer; the database including playback attributes for tracks of the compact discs; displaying a table of tracks of the plurality of compact discs; selecting a sequential set of tracks from the plurality of compact discs to define a play list; and sending a sequence of commands from the computer to the multiple compact disc changer to sequentially play the selected tracks from the play list.

The above objects, advantages and features of the invention, as well as others, will become apparent to those skilled in the art upon consideration of the following description of the invention.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

BRIEF DESCRIPTION OF THE DRAWING

FIG. 1 illustrates the TOC data format for a conventional compact disc.

DETAILED DESCRIPTION OF THE INVENTION

Figure 2:
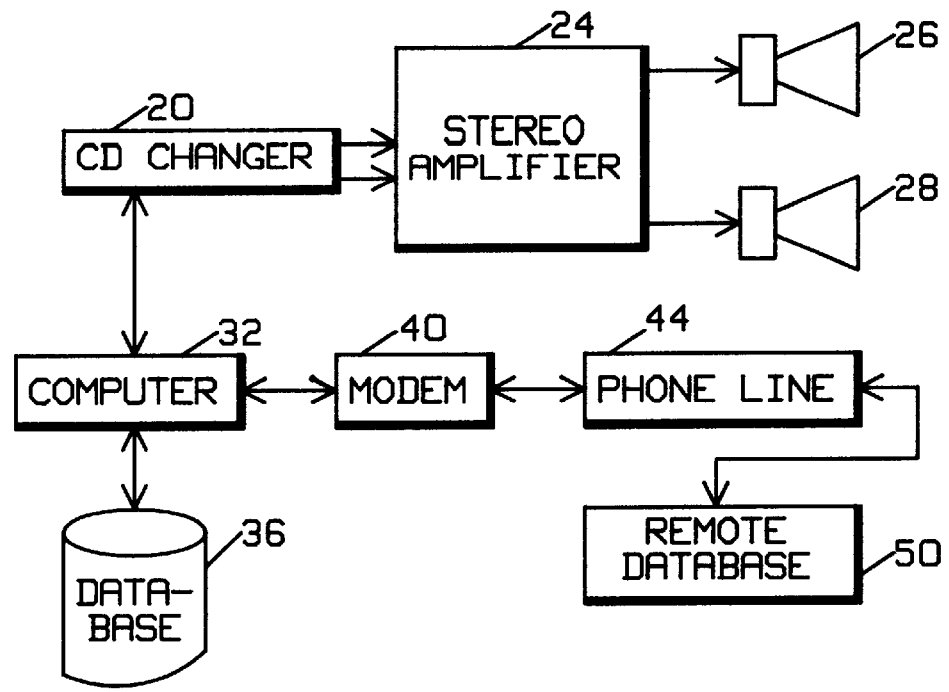
FIG. 2 is a block diagram of a first embodiment of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

Before discussing the actual method and apparatus of the present invention in detail, it is useful to understand several basic concepts relating to the standard formatting of compact discs so that the options available for uniquely identifying each disc are understood. Conventional music compact discs are formatted according to a specification which is known in the industry as the "Red Book" specification. The format is also discussed in, for example, chapter 5 of *Compact Disc Technology,* by Heitaro Nakajima and Hiroshi Ogawa, 1992, Ohmsha, Ltd., 3-1 Kanda Nishiki-cho, Chiyoda-ku, Tokyo 101, Japan, which is incorporated herein by reference. While the Red Book specification permits an identifying code to be used with each disc, the industry rarely utilizes this option. Thus, there is no unique label which is currently assured of being available for each disc. However, the Red Book specification defines a lead-in area to include an area of subcoding having so called P-channel data and Q-channel data. This data includes information known as the Table of Contents (TOC) which is somewhat analogous to the table of contents of a book. Since each CD is unique in exact content, it is possible to use this the TOC information as a sort of "fingerprint" to uniquely identify each CD.

FIG. 1 illustrates the format of a TOC entry for a typical music compact disc. It is noted that a frame of TOC data is provided for each track (movement) of the music disc. Each TOC entry includes the elapsed time of each movement and an absolute time for the POINT content. These times are extremely precise in that they are measured in minutes, seconds and frames. Each disc may include up to 99 such tracks or movements with each TOC entry occupying 72 bits. The TOC entries are repeated in order to fill the entire lead-in area. As stated above, a small portion of this TOC information has been used to uniquely identify compact discs for purposes of the "Custom File" feature in Sony compact disc players. In the present invention, a larger sampling of the data may be required to uniquely identify or "fingerprint" each compact disc, since the invention depends upon unique identification of all discs in an extremely extensive database. The solution to this problem is to simply select a sampling of information which is large enough to uniquely identify each disc.

An enormous amount of data is available on each disc which can be used to uniquely characterize each disc. The TOC entry for the first movement alone could theoretically account for up to $2^{72}$ (which is approximately 4.7E21) unique discs. In practice, the actual number of unique values which are likely to occur in this one entry is substantially lower since a typical movement has a duration of approximately three minutes, the movement number for the first movement is always 1, the POINT value is often the same, etc. Even so, it is clear that each disc has an adequate amount of unique information that one can readily understand that each compact disc has its own unique "fingerprint" which can be used to uniquely identify the disc from all other discs. By way of example, and not to be limiting, an extremely large number of discs could be uniquely identified by examining the number of movements, the play time of each movement (or, e.g. the play time of the first five movements) and the total play time of the CD. Such a scheme would provide data of a manageable size which would uniquely identify a vast number of discs. Due to the variables mentioned earlier, the exact number of discs which can be identified by this scheme for practical purposes is difficult to ascertain with any degree of exactness, but is clearly huge. Other combinations will occur to those skilled in the art. The exact scheme selected should be based upon an analysis of a large sampling of compact discs to assure that enough TOC data is used without making the amount of data unnecessarily large.

In addition to the above example of using TOC data for the identifying information, a sample of the actual disc data representing a musical selection or movement can also be used to uniquely identify each disc. Due to the wide dynamic range of music characterized on each disc, several data samples taken at consistent locations on a disc can also be statistically likely to uniquely identify the disc, either alone or in combination with a portion of the TOC data. Thus, by selecting a large enough sampling of data to characterize each disc, it is possible to uniquely identify each disc which has been manufactured and which is likely to be manufactured in the future. Accordingly, an exact definition of the "fingerprint" data is to be determined by a detailed analysis of a large body of discs and is not critical to the understanding of the overall concept and operation of the present invention. After selection of such a sampling of data to be used as a CD "fingerprint", in the unlikely event that the identifying "fingerprint" of two or more discs are the same, remedies such as user selection of the appropriate disc are contemplated by the present invention.

Referring now to FIG. 2, a first embodiment of a system according to the present invention is shown in block diagram form. In this embodiment, a CD changer 20 is coupled in a conventional manner to a stereo amplifier (or receiver) 24 which provides power amplification suitable to drive a pair (or more) of stereo speakers 26 and 28 or headphones (not shown). According to the present embodiment, the CD changer 20 includes an interconnection to an external computer 32 such as a personal computer or a dedicated computer designated to carry out the functions of the present invention. Computer 32 includes input devices such as a keyboard, mouse or other input device and a display screen. Computer 32 may be coupled to the CD changer 20 via any suitable standard or proprietary interface including SCSI or RS-232, or via a local area network interconnection as desired. Computer 32 includes a disc drive 36 including any suitable database management software (for example, a SQL compliant database such as those commercially available from various manufacturers).

Computer 32 also includes a modem 40 (either internal or external) which is connected to a telephone network 44.

While the present invention contemplates a conventional data modem connection using conventional telephone service, those skilled in the art will appreciate that a number of alternatives are possible such as ISDN networks and associated terminal adapters.

In operation, the present invention utilizes the modem 40 to dial up a database 50 which may be maintained by an online service provider or made available on the Internet, for example. Database 50 is preferably industry maintained to assure the maximum level of completeness, but could also be maintained by the user community, the CD changer manufacturer, commercial ventures or other sources. Database 50 includes identifying information as described above for a large body of compact discs which is associated with tabulated data for each disc. An example of the type of data in such a database is illustrated in TABLE 1 below. The preferred method for accessing and utilizing this information will described later.

plurality of CDs. In particular, the memory 72 contains information relating to at least all of the CDs presently stored in the multiple disc changer mechanism, but may also be more extensive. Controller 68 is coupled to a multiple disc CD changer mechanism 74 such as that used in the commercially available Sony CDP-CX153 and associated signal processing circuitry 78 to provide control thereto in a conventional manner. Controller 68 is also coupled to a display/control panel 82 to receive commands directly from the user and to provide visual displays in a more or less conventional manner. In addition, controller 68 may be coupled to an infra-red (or RF) receiver 84 which receives control signals from a remote commander.

Controller 68 is used to control the normal functions of the compact disc changer 20 in a conventional manner and in addition provides the function of (1) receiving memory updates from the computer interface 64, (2) updating memory 72, and (3) sending requests, via interface 64 for information updates for memory 72.

TABLE 1

| Fingerprint | CD-Title | Artist | Movement #1 Title | Movement #1 time (Min, Sec, Frame) | ... |
|---|---|---|---|---|---|
| ... | ... | ... | ... | ... | ... |
| ~~~ | The New York Album | Yo-Yo Ma | Concerto for Cello and Orchestra: I. Audacemente ma sostenuto | 06:38:42 | ... |
| ... | ... | ... | ... | ... | ... |

| ... | Movement #99 Title | Movement #99 time (Min, Sec, Frame) | Total play time (Min, Sec, Frame) | Total # of Movements |
|---|---|---|---|---|
| ... | ... | ... | ... | ... |
| ... | null | 00:00:00 | 78:04:22 | 8 |
| ... | ... | ... | ... | ... |

As illustrated in TABLE 1, the machine readable data available on the actual CD can be supplemented substantially by the addition of titles of each movement, CD title, Artist, etc. Those skilled in the art will also understand that the database can also include even more detailed information such as composer, producer, record label, as well as any other information which might be of value to the user. While TABLE I illustrates the data in a form which might be interpreted as a flat field database, those skilled in the art will understand that the data may be more readily stored in the form of a relational database. TABLE 1, is thus intended to be an illustrative example of the database and should not be considered limiting since those skilled in the art will understand that the database may be designed in numerous ways and may contain any relevant data of the designer's choosing.

Figure 3:
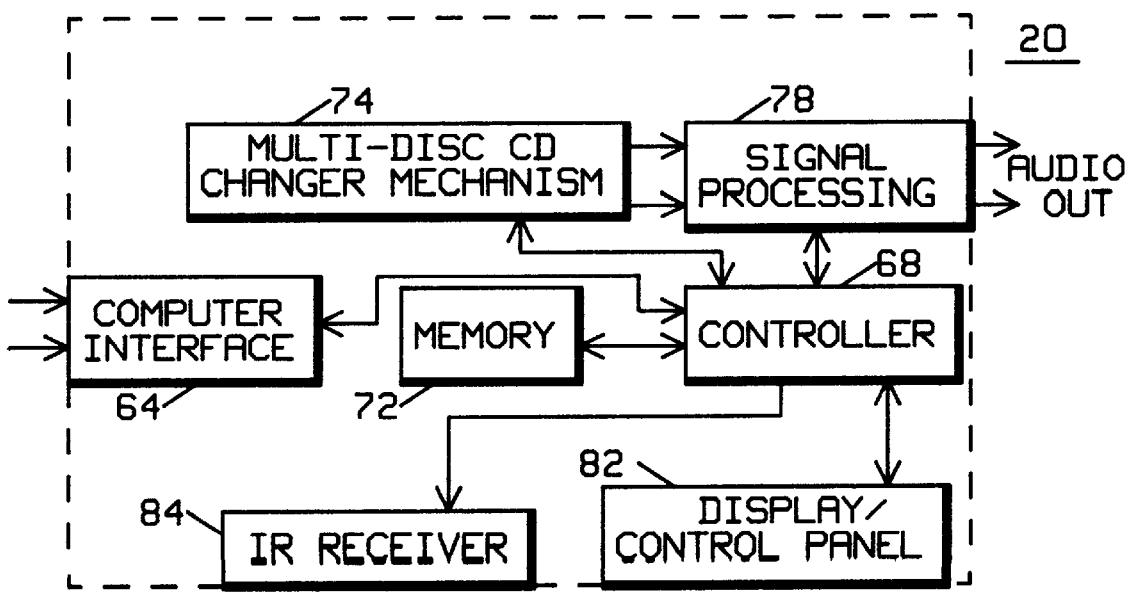
FIG. 3 is a block diagram of the CD changer 20 of FIG. 2.
Figure 4A:
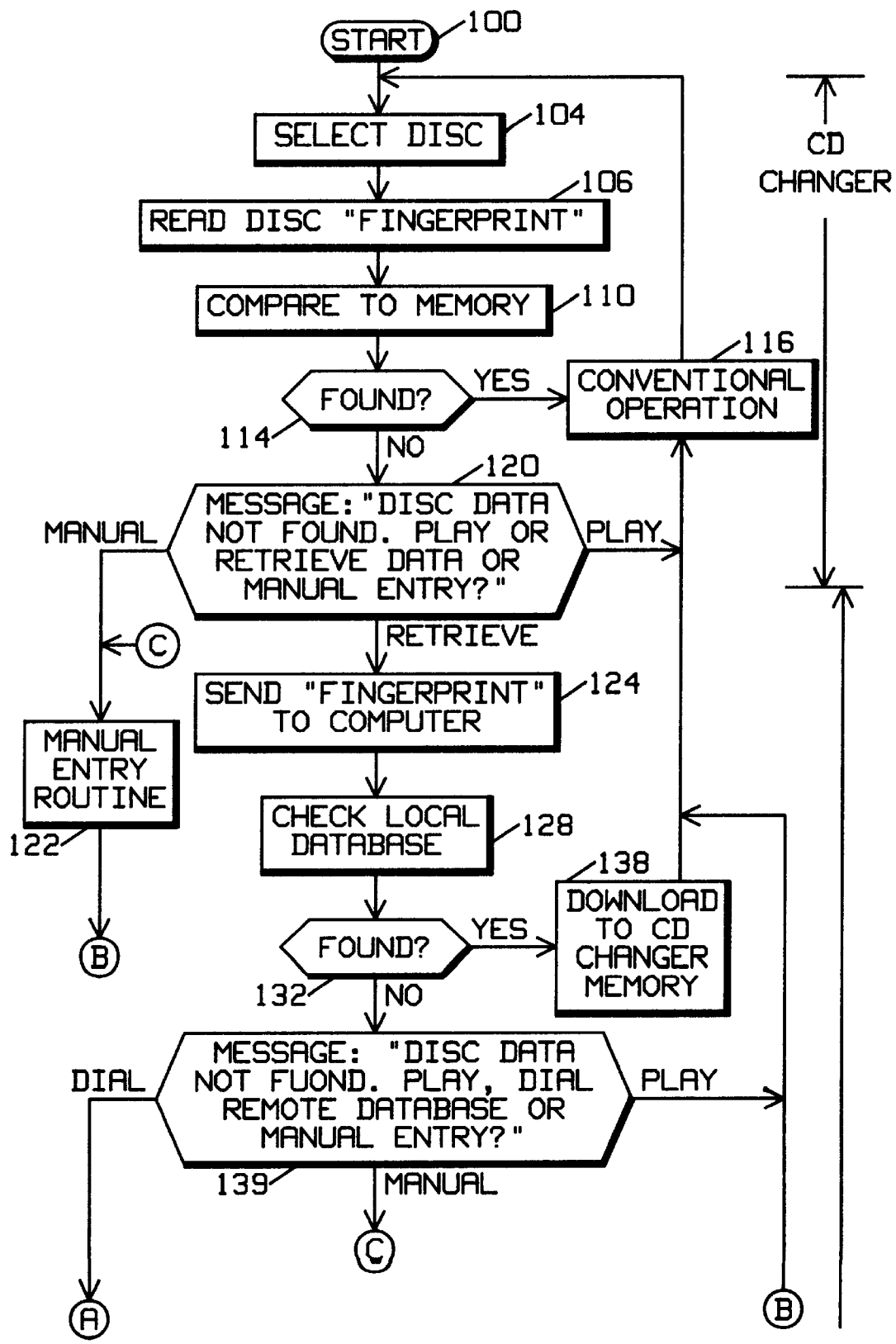
FIG. 4, which is shown as FIG. 4A and FIG. 4B, is a flow chart describing the operation of one embodiment of the present invention.
Figure 4B:
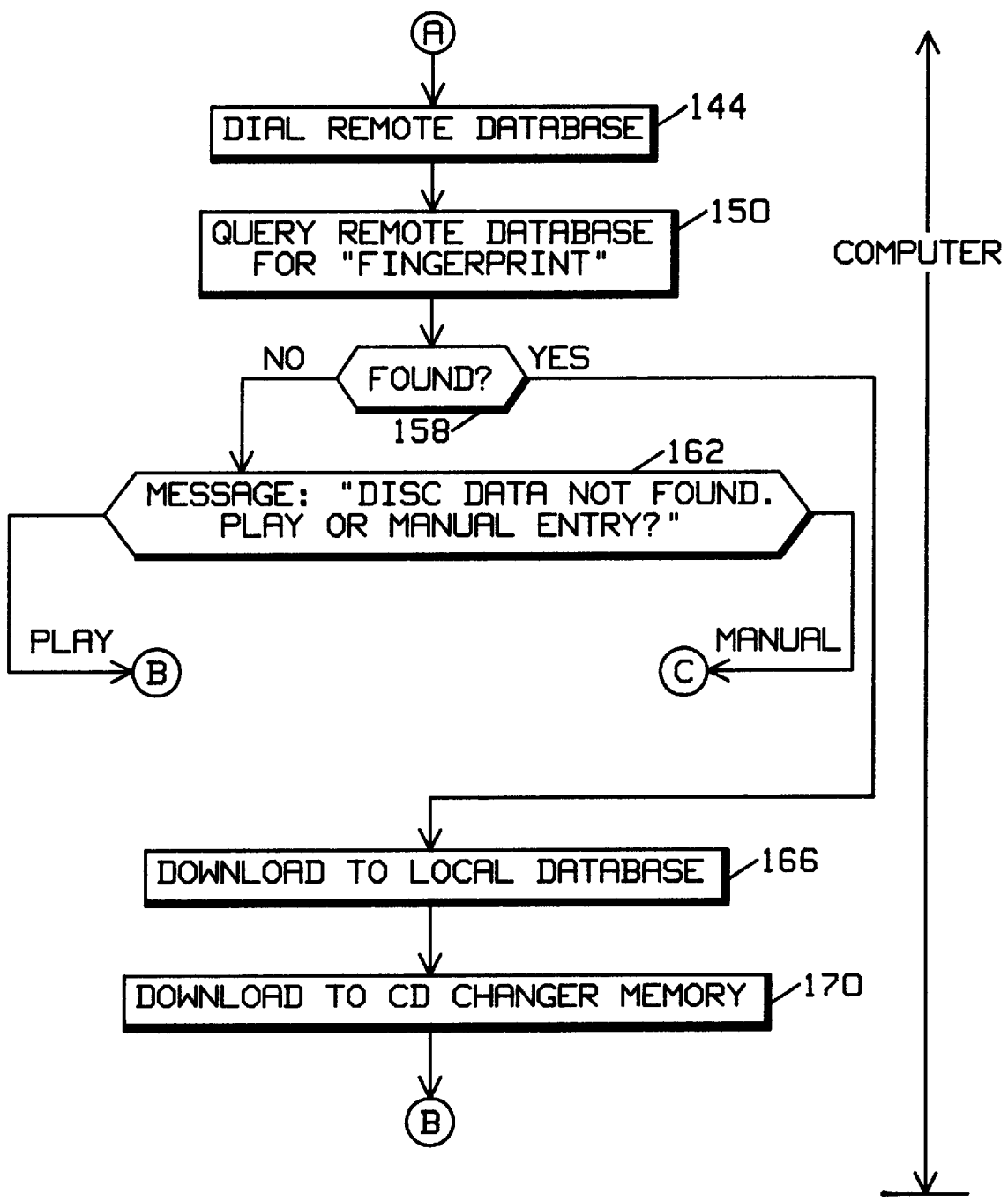

Referring now to FIG. 3, a more detailed diagram of the CD changer 20 of FIG. 2 is illustrated. The interconnection with computer 32 is provided via a conventional computer interface 64. Interface 64 is coupled to a microprocessor based controller 68 to provide communication between the computer 32 and the controller 68. Controller 68 is coupled to a memory 72 which is preferably a non-volatile read-write memory such as an Electrically Erasable Programmable Read Only Memory (EEPROM) or a battery backed up Random Access Memory (RAM). Memory 72 is used to store an internal database of information relating to a One method of operation according to the present invention is illustrated in the flow chart of FIG. 4 (which is broken down into FIGS. 4A and 4B. The process starts at step 100. When the user selects or loads a disc at step 104, the controller 68 directs the changer mechanism 74 to read the portion of the disc which contains the identifying information or "fingerprint" of the selected disc at step 106. The controller then compares this with the "fingerprints" stored in memory 72 at step 110. If the "fingerprint" is found at step 114, the CD changer 20 operates in a more or less conventional manner at step 116 and then returns to await the next disc selection.

If the "fingerprint" is not found at step 114, the user is informed via a display (or other message system) indicating that the disc data was not found in the CD changer's database. The user is then asked if the disc is to be played, if the user wishes to attempt to retrieve the data from a database, or if the user desires to enter data manually at step 120. The user may respond via a remote commander or via the display/control panel 82. If the user decides to simply play the disc (for example, if the disc is borrowed or infrequently played), control returns to step 116 where conventional operation proceeds. If the user decides to enter the data manually, a manual entry routine is initiated at step 122. Such manual entry can be accomplished in a manner similar to that used in commercially available CD changers to enter so-called "custom file" information. After step 122, control returns to step 116. If the user decides to attempt to retrieve data, the disc's "fingerprint" is sent to the computer 32 via the computer interface 64 at step 124. Under software control, the computer 32 then initiates a query of the database stored in disc drive 36 to attempt to match the "fingerprint" in question at step 128. If found at step 132, the appropriate portions of the database are downloaded to the CD changer's memory at step 138 and control returns to step 116. Thus, the user is received of the burden of manual entry.

In the event the "fingerprint" is not found at step 132, the user may be informed at step 139. At this point, the user can again make a decision as to whether to simply play the disc, make further attempts to download information from a database or opt for manual entry of the data. If the user elects to play the disc, control returns to step 116. If the user elects to enter the data manually, control returns to step 122. Manual entry routine 122 should preferably utilize the connection to the computer 32 in order to permit a simplified manual entry of the data via the keyboard of computer 32. If the user elects to make further attempts to download the data, the computer 32 initiates a call to the remote database 50 via modem 40 and telephone line 44 to attempt to retrieve the data. Once the database is accessed, computer 32 initiates a query of the remote database to locate the "fingerprint" for the disc in question at step 150.

If the disc's "fingerprint"s not found, a message is provided at step 162 indicating such and providing the user with the option of entry of the data or playing the CD without data entry. If the user elects to play, control again returns to step 116. If the user elects to enter data manually, this can be carried out at the computer keyboard at step 122. If the "fingerprint" is found in the remote database at step 158, the computer 32 downloads the data to the local database stored at 36 at step 166. Computer 32 then proceeds to download the appropriate data to the changer's memory 72 at step 170. Once the data is stored in the database at 36, the user can utilize the search power of the database management software to find selections; categorize discs, by music type, artist, etc.; and perform other known database management activities.

Once the above-referenced interconnection between the CD changer 20 and computer 32 is established, and once the local database is created, this arrangement can be used advantageously to control operation of the CD changer by utilizing the computer's keyboard, mouse or other input devices. The computer may be used to provide a friendlier interface to the user than that provided by a conventional CD changer to permit the user to start or stop play of a CD, select a play list, identify a CD or track of a CD for play, search for a passage in a CD, and in general effect control over all aspects of the CD changer. In order to illustrate this, consider FIG. 5 which illustrates first the local database (shown as 174) arranged as an array of cells. The above control can be effected by selecting any of the desired CD changer functions from a menu of available functions or by directly typing commands from the computer keyboard. Those skilled in the art will understand that there are many ways to represent these control functions in a user interface, for example, a menu bar can be provided with drop down menus or particular control icons can be provided. Such an interface will desirably occupy the computer's display simultaneously with the database tables including data relating to the compact discs.

Figure 5:
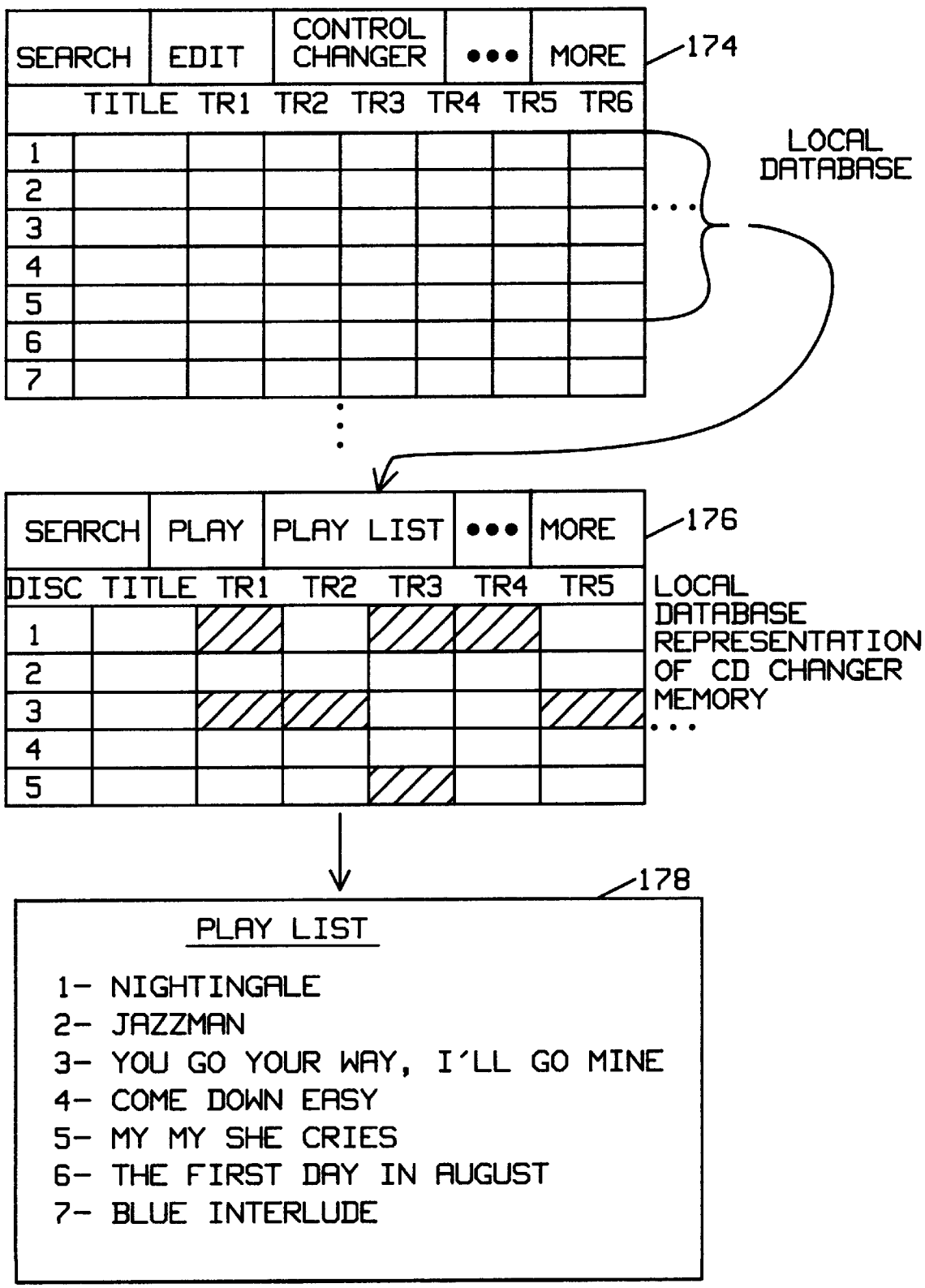
FIG. 5 illustrates the use of computer 32 for control of the CD changer 20.

In one embodiment of the enhanced control possible with the present invention, the user may generate a play list by first having the computer 32 query the CD changer 20 to determine which CDs are contained within the changer as identified in the memory 72. Since the local database 174 can carry information regarding as many CDs as the user desires without regard for the content of the CD changer 20, the user can then reduce the display of the local database 174 to a representation of only those discs which are in fact loaded into the CD changer 20. This reduced representation 176 is shown as having only 5 entries corresponding to 5 compact discs. In other embodiments, the loaded discs might be represented in a different color or might be accented in some other manner. Once the user has a display of the available discs including the titles of all tracks on the discs, the user can create a play list by simply reviewing the available tracks and then making a selection by, for example, clicking a mouse button when a display cursor points to a desired selection and then confirming that the item is to be added to a play list. This is shown in FIG. 5 as shaded blocks in database 176. Once the user selects an item for the play list, the play list can be reviewed in a play list window or screen shown as 178. Thus, the user can select as many selection for play in a specified order as desired. The selection is made based upon the full knowledge of the title of the selection and/or the disc, rather than simply the disc number and track number. In addition, the power of the database management software can be used to search for particular selections to add to the play list. Thus, for example, the user could initiate a search by entering specific key words. The search results can be presented as a list of possible tracks or discs containing the key word(s) and the user can add the track or disc to the play list by selecting the desired match.

Once the play list is assembled in this manner, the user can then initiate play of the list at 188. The control interface can be implemented as a character or graphical user interface as desired, In one embodiment, the interface can be designed in a manner similar to that of the Music Box window available in the Microsoft Windows™ operating system and may include all conventional instructions which could be issued via a remote control (including stop, play, pause, skip back, skip forward, play modes such as shuffle and repeat, volume, sound fields, etc.). In addition, the interface can include character and graphic displays of such attributes as CD and track play time, CD and track time remaining, track number, track title, CD title, Artist and any other desired information from the database. Of course, in the Music Box interface, any desired database information must be entered by the user, and this interface does not have a communication mechanism which permits the computer to know the disc content of a multiple disc player. Those skilled in the art will understand that many variations of this procedure can be implemented within the scope of the present invention.

Figure 6:
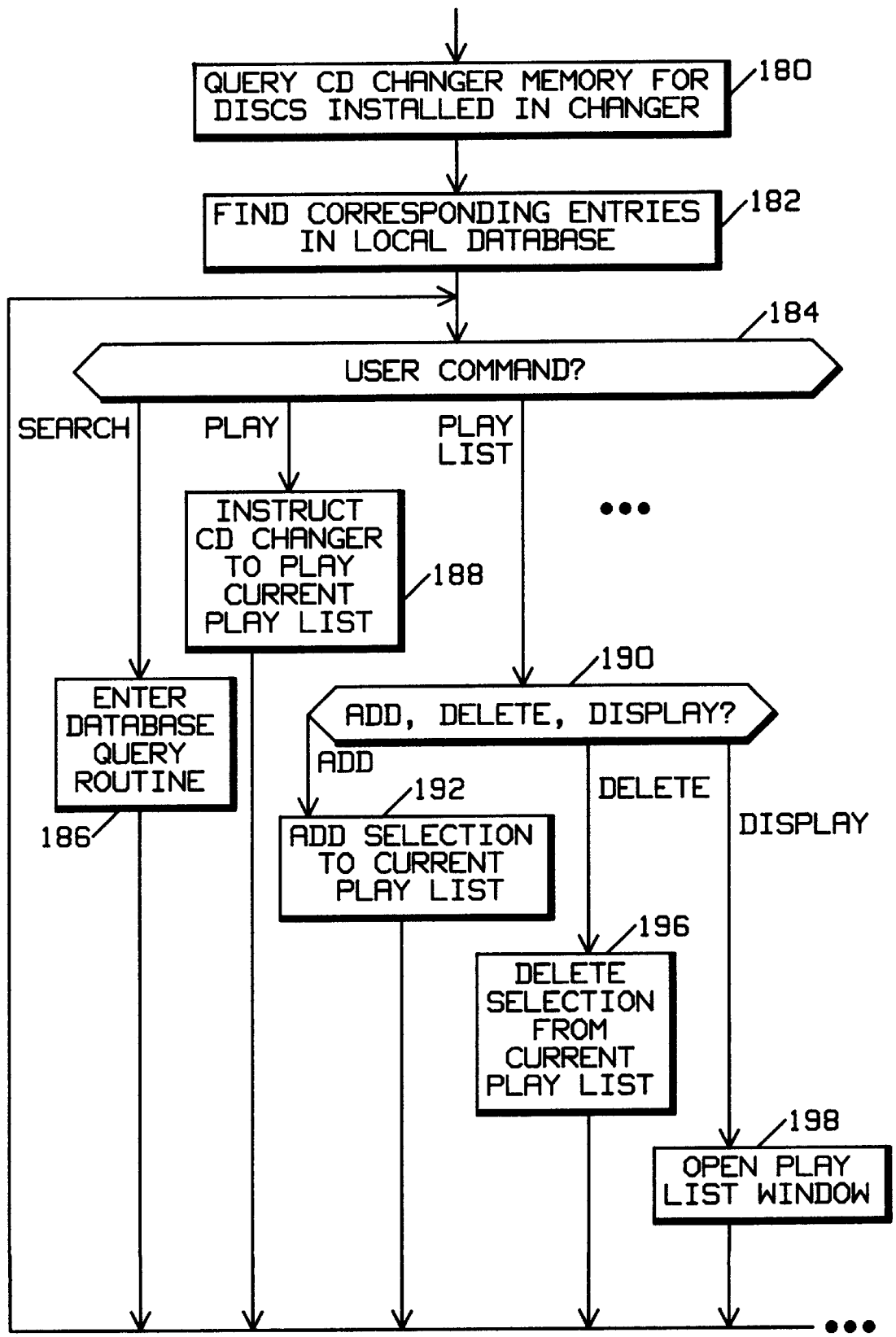
FIG. 6 is a simplified flow chart of one embodiment of a routine for issuing commands to the CD changer 20.

With reference to FIG. 6, one simplified process for implementing the control of CD changer 20 is illustrated. Those skilled in the art will appreciate that many variations of this implementation are possible, and an implementation similar to this could be built around the Microsoft Music Box program as described above. At step 180, the CD changer 20 is queried by the computer 32 for a listing of all CD "fingerprints" for CDs which are currently installed in the CD changer. This step can be carried out whenever the user requests it or whenever the CD changer detects that a CD has been loaded or unloaded. At step 182, these "fingerprints" are checked against the local database 174 and the local database is restricted to those CDs currently installed in the database at 182. This produces an image of the CDs currently installed at step 176. At this point, the user can scan the matrix displayed as 176 and select CDs or tracks to be added to the play list using mouse or keyboard commands. Alternatively, the user can implement a search at step 184 by selecting "SEARCH" from a menu (e.g. a menu bar, menu button or icon). In this event, the database is searched using conventional query methods at step 186. When the query is completed, a display of the matching selections is shown for the user to select from and control returns to step 184.

Once one or more selections are made, the user can select the "PLAY LIST" command from the menu. At this point the user can select any variety of play list related commands at step 190. Step 190 illustrates three such commands, but those skilled in the art will understand that a full complement of such commands can be programmed as desired. If the user selects "ADD" at 190, control passes to a routine 192 that adds the selected tracks or CDs to the current play list. If "DELETE" is selected at step 190, control passes to a routine 196 which deletes the selected tracks or CDs from the current play list. If "DISPLAY" is selected, a window such as 178 is opened to show a list representation of the play list. Of course, once the play list is represented as list 178, the user can more readily see the listing of songs or CDs selected in their playing order and can preferably manipulate the list directly to delete items, rearrange items, etc.

Those skilled in the art will appreciate that the process of FIG. 6 is but one partial illustration of a command structure which could be utilized to control CD changer 20. Obviously, many additional useful commands (as discussed above) can be implemented throughout the process. Accordingly, the present process is not intended to be limiting, but rather, illustrative of the type of control that can be implemented once the computer 32 is linked to the CD changer 20 and once the power of the database is harnessed for use in controlling the CD changer 20.

Once the user has access to the entire content of a compact disc via the database 174, other opportunities for control are possible. For example, the Sony CDP-CX100 includes a function known as "custom files" in which, for example, the volume level for playback can be stored along with each disc (a so-called "level file"). Once the user has access to the database 174 including information regarding every track of every disc, one can readily appreciate that the individual attributes of each track can be individually controlled via computer 36. For example, in an extension of the "custom file" function of the CDP-CX100, computer 36 can issue commands to the CD changer 20 to alter the volume level on a track by track basis on the playback list. Moreover, other attributes such as sound fields can similarly be manipulated on a track by track basis. Thus, the play list and/or the local database can also include entries for attributes associated with each track as illustrated in TABLE 2 below. Such entries can be expanded in a separate window showing selections of attributes for each database entry (track).

TABLE 2

Track Title: Come Down Easy
Track: 1
Disc: 3
Disc Title: Rhymes & Reasons
Artist: Carole King
Play Time: 03:06
Play Attributes:

Level: 65%
Sound Field: Live Room

Thus, for the example of TABLE 2, at play time the track will be played at a volume level of 65% with a signal processing sound field "live room". Of course, other user controllable attributes can similarly be stored and assigned on a track by track basis.

Figure 7:
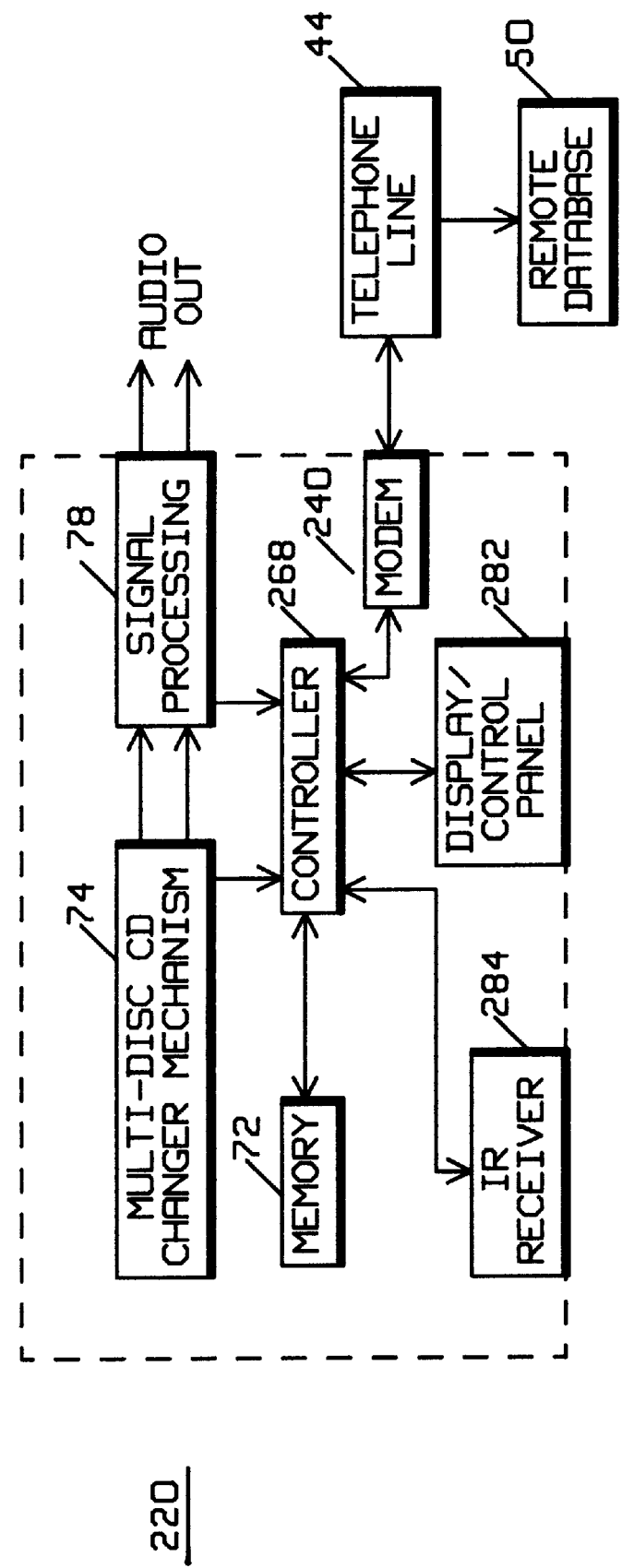
FIG. 7 is a block diagram of a second embodiment of the present invention.

Referring now to FIG. 7, a second embodiment of the present invention is shown. In this embodiment, a compact disc changer 220 incorporates an internal modem 240 which operates under the control of controller 268 to access remote database 50 via telephone line 44. In this embodiment, a portion of the function of computer 32 is absorbed into the compact disc changer 220. The function and operation of controller 268 is similar to that of controller 68 except that the additional functions required to control modem 240 and the additional search and communications functions are incorporated therein. Infrared receiver 284 is similar in function to that of infrared receiver 84, except that it may require a broader vocabulary of commands in the absence of the computer 32. Similarly, display/control panel 282 is similar to that of display/control panel 82 except that in the absence of the computer display and keyboard, a more extensive display and keyboard function is desirable.

In operation, the CD changer 220 of FIG. 7 performs functions similar to those of CD changer 20 of FIGS. 2 and 3, except that the local database search is bypassed. Of course, those skilled in the art will appreciate that by incorporating mass storage into the CD changer 220, the function of computer 32 could be more or less completely integrated into a single package.

Figure 8:
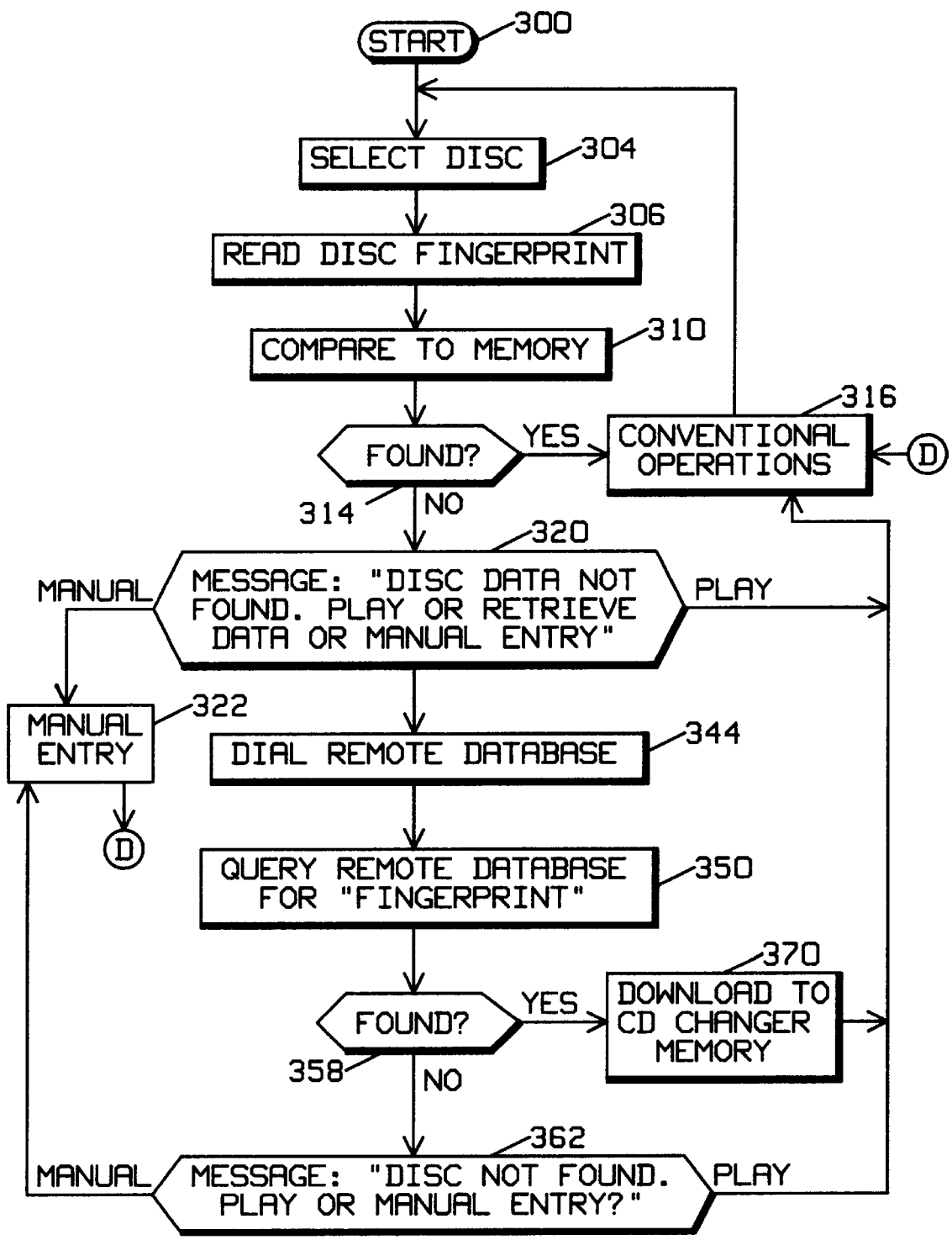
FIG. 8 is a flow chart describing the operation of the second embodiment as shown in FIG. 7.

FIG. 8, illustrates one method of operation of CD changer 220. This method starts at step 300, When the user selects or loads a disc at step 304, the controller 268 directs the changer mechanism 74 to read the portion of the disc which contains the identifying information or "fingerprint" of the selected disc at step 306. The controller then compares this with the "fingerprints" stored in memory 72 at step 310. If the "fingerprint" is found at step 314, the CD changer 220 operates in a more or less conventional manner at step 316 and then returns to await the next disc selection at step 304.

If the "fingerprint" is not found at step 314, the user is informed via a display (or other message system) indicating that the disc data was not found in the CD changer's internal memory 72. The user is then asked if the disc is to be played or if the user wishes to attempt to retrieve the data from a database, or if the user desires to enter data manually at step 320. The user may respond via a remote commander or via the display/control panel 282. If the user decides to simply play the disc, control returns to step 316 where conventional operation proceeds. If the user decides to enter the data manually, a manual entry routine is initiated at step 322 and then control returns to step 316.

If the user wishes to download information from a database at step 320, control passes to step 344 where the controller 268 directly initiates a call to the remote database 50 via modem 240 and telephone line 44 to attempt to retrieve the data. Once the database is accessed, controller 268 initiates a query of the remote database to locate the "fingerprint" for the disc in question at step 350.

If the disc's "fingerprint" is not found, a message is provided at step 362 indicating such and providing the user with the option of manual entry of the data or playing the CD without data entry. If the user elects to play, control again returns to step 316. If the user elects to enter data manually, this can be carried out via the remote commander or the display/control panel at step 322. If the "fingerprint" is found in the remote database at step 358, the controller 268 downloads the data to the changer's memory 72 at step 370.

Thus, by the above processes, the CD changer's memory can be updated without need for tedious manual entry whenever the disc in question can be found in the computer's local database or when the information can be downloaded from a remote database. For the sake of not obscuring the present invention with unnecessary details, the above process has been described without the details of error trapping, database format, communications protocol for contact with the remote database, full messaging and other details which are not required for the understanding of the present invention. In addition, the above process, of course, assumes that the computer is active at the time of the need for contact by the CD changer. These details are well within the abilities of those skilled in the art and need not be explained here. In addition, as CD formats evolve to incorporate specific identifying information stored on the disc for this purpose (or to contain the actual database information), the present invention contemplates utilizing this information to the extent it is available.

Many alternative embodiments of the above processes will occur to those skilled in the art. For example, the processes described can be carried out with the CD in question playing while the database updating process is carried out. In another variation, the user may select default answers to the download queries of steps 120, 138, 162, 320, or 362. In addition, although the possibility of having two discs which have identical "fingerprints" is remote, the process can provide the user with the ability to select among them if the situation were to occur.

While the present invention has been described in terms of a compact disc as the media containing the program material, the present invention also contemplates equivalent embodiments in other music or video or other recording media which might not contain machine readable information which would be useful to a user of the media. For example, an equivalent embodiment can be devised for media such as the MiniDisc™, digital video discs or other as yet undeveloped media. Accordingly, the present invention should not be limited to the illustrated format.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of controlling the operation of a compact disc player, comprising:

storing data relating to a compact disc in a database, said database including information relating to each track of said compact disc;

responsive to user input, storing playback attributes in said database on a track-by-track basis by storing a first playback attribute corresponding to a first track on the compact disc and a second playback attribute corresponding to a second track on the compact disc, the first playback attribute differing from the second playback attribute; and instructing said compact disc player to play at least one of the first track using the first playback attribute and the second track using the second playback attribute.

2. The method of claim 1, wherein the playback attributes include a level attribute.

3. The method of claim 2, wherein the playback attributes include a signal processing parameter.

4. The method of claim 1, wherein said database is located in a computer external to said compact disc player and wherein said instructing includes sending an instruction from said computer to said compact disc changer.

5. The method of claim 4, wherein said instructing includes instructing said compact disc player to play a track from a play list.

6. A method for controlling the operation of a multiple disc compact disc player, comprising:

storing data relating to a plurality of compact discs in a database, said database including information relating to each track of each said compact disc, and wherein said database is located in a computer external to said compact disc player;

responsive to user input storing playback attributes including at least a level attribute and a signal processing attribute in said database on a track-by-track basis wherein for a given compact disc the database stores a first playback attribute corresponding to a first track on the given compact disc and a second playback attribute corresponding to a second track on the given compact disc, the first playback attribute differing from the second playback attribute; and instructing said compact disc player to play a selected track from a play list using said playback attributes by sending an instruction from said computer to said compact disc player.

* * * * *